United States Patent

Corkum et al.

[11] Patent Number: 5,824,902
[45] Date of Patent: Oct. 20, 1998

[54] CONDITION RESPONSIVE SENSOR HAVING A SIGNAL CONDITIONING CAPACITOR

[75] Inventors: David L. Corkum, Attleboro, Mass.; June Park, Providence, R.I.; Keith W. Kawate, Attleboro Falls, Mass.

[73] Assignee: Texas Instruments Incorporated, Dallas, Tex.

[21] Appl. No.: 723,434

[22] Filed: Sep. 30, 1996

[51] Int. Cl.[6] .................................................. G01P 15/125
[52] U.S. Cl. ...................................... 73/514.32; 361/280
[58] Field of Search ........................... 73/514.32, 514.18, 73/514.36, 718, 724, 862.626; 361/283.1, 283.3, 283.4, 280

[56] References Cited

U.S. PATENT DOCUMENTS

| | | | |
|---|---|---|---|
| 4,982,351 | 1/1991 | Kawate et al. | 364/571.01 |
| 5,092,174 | 3/1992 | Reidemeister et al. | 73/514.32 |
| 5,239,871 | 8/1993 | Reidemeister et al. | 73/514.32 |
| 5,345,823 | 9/1994 | Reidemeister et al. | 73/514.32 |
| 5,499,158 | 3/1996 | Bishop et al. | 361/283.4 |

*Primary Examiner*—John E. Chapman
*Attorney, Agent, or Firm*—Russell E. Baumann; Richard L. Donaldson; Rene' E. Grossman

[57] ABSTRACT

A first embodiment of a condition responsive capacitive transducer, such as an accelerometer (1), is shown in which an electrically conductive sensor element (14) is sandwiched between upper (10) and lower (12) electrically insulative planar substrates and mounted in sealed, spaced apart relation by patterns (16) of adhesive containing spacing elements. A second embodiment (100) includes a signal conditioning capacitor having plate portions (114r, 120b and 114s, 120c) on either side of a condition responsive capacitor to minimize errors caused by translational movement of the sensor element (114) relative to the substrates (110, 112). Circuit conditioning electronics (124) is shown mounted directly on one of the substrates (110) and the sensor is mountable directly on a circuit board. A third embodiment (200) shows differential capacitors (224, 226, 228, 230, 232, 234) for minimizing errors due to misalignment of the movable element (114) with respect to the fixed supports (210, 212). Another embodiment provides a material system for use in condition responsive capacitive transducers having refractory metal for a sensing element and glass material for a supporting substrate.

8 Claims, 5 Drawing Sheets

CONDITION RESPONSIVE SENSOR HAVING A SIGNAL CONDITIONING CAPACITOR

BACKGROUND OF THE INVENTION

This invention relates generally to condition responsive sensors and more particularly to sensor apparatus such as accelerometers having acceleration responsive means which are mechanically movable for providing an electrical signal dependent upon such movement.

Condition responsive sensors, such as capacitive accelerometers and the like, are commonly used in aircraft and automobile applications and the like where the sensors are likely to be subjected to shock, vibration and severe temperature changes. An example of a sensor of this type is shown in commonly assigned U.S. Pat. No. 5,345,823. In that patent a rigid electrically insulating ceramic substrate has a recess formed in one substrate surface with electrically conductive film means deposited on that surface to define a capacitor detect plate inside the recess. A flat electrically conductive plate member of stiffly resilient metal having an attachment portion and provided with a capacitor source plate portion is disposed in overlying relation with the attachment portion secured to the substrate. The source plate portion is movable along a first axis toward or away from the detect plate in response to acceleration forces along that axis. The accelerometer device includes a housing which also mounts a printed circuit board having signal conditioning components mounted on the board. Shield means in the form of a metal sheet is disposed on the housing for shielding the device from electromagnetic interference.

BRIEF SUMMARY OF THE INVENTION

It is an object of the present invention to provide a condition responsive sensor such as an accelerometer of the type described which has improved reliability and minimized error characteristics. Another object is the provision of such a sensor which is compact and of rugged structure adapted to withstand use in severe vehicular environments. Yet another object is the provision of such a sensor which is particularly adapted for automated manufacturing techniques.

Briefly, the novel and improved condition responsive sensor of the invention comprises an accelerometer or the like having condition responsive means movable in response to the occurrence of a condition to provide an electrical signal dependent upon such movement. In a first embodiment, first and second generally planar sheets or substrates of electrically insulating material are each provided with a screened printed pattern of adhesive material containing spacer elements on facing surfaces surrounding a sensor element received between the sheets and with the printed patterns on the first and second sheets in alignment with each other to space the sensor element from each sheet. The sensor element in the form of an electrically conductive plate is patterned to provide a cantilevered portion defining a seismic mass which serves as a detect plate movable between the sheets toward and away from a source plate deposited on at least one of the sheets in alignment with the detect plate. One of the sheets may extend beyond the other sheet, as shown. Associated electronics is shown mounted on the extension of the sheet but could be mounted on any exterior sheet surface. An electrically conductive shield layer is preferably deposited on the outer face surfaces of the first and second sheets not serving as an electronics mount.

The sensor of the first embodiment can be conveniently assembled in one or multiple device width strips in batches or continuously to form individually, hermetically sealed devices.

In accordance with a second embodiment, a circuit board mountable device is shown in which a plurality of terminal pins serve to electrically interconnect the accelerometer device to a mother board as well as to physically mount the device thereon. The condition responsive device of the second embodiment provides a sensor having improved accuracy and time stable output over a wide operating temperature range and harsh mechanical handling. The substrate metallization pattern and the configuration of the electrically conductive detect or sensor element minimize thermal and post impact output offset errors by means of a common mode rejection arrangement. The sensor element, serving as a seismic mass, is configured with a narrow peripherally extending support frame from which a cantilevered blade extends from a first neck portion on one side of the frame. The blade in turn has a narrow marginal beam extending from a location proximate to either side of the first neck portion in a first, or X-direction, away from the first neck portion along the first side of attachment and down, in a second, or Y-direction 90° relative to the X-direction, along each opposite side of the sensor element adjacent to the side of attachment toward the side opposite to the side of attachment and then inwardly, in the X-direction, to a second neck from which extends an end portion extending in the Y-direction inwardly, back toward the first neck portion. First and second side portions of the blade are thereby formed between the beam and the end portion with the width of each side portion in the X-direction generally equal to one another and with the width of the first and second side portions together generally equal to that of the end portion at any point taken along the Y-direction.

The sensor element is sandwiched between upper and lower planar sheets or substrates with each sheet having a pattern such as a strip of adhesive material containing spacer elements printed thereon along each side with the strip in registration with the peripheral support frame and neck of the sensor element and extending on either side of the frame and neck to form a substrate/adhesive/substrate seal capturing the support frame. A suitable electrically conductive pattern deposited on the substrates include a stationary source plate and first and second stationary side portion plates aligned respectively with the end portion which serves as a detect plate and first and second side portions of the sensor element. The end portion and corresponding source plate serve as the accelerometer capacitor which is interdigitated between the stationary side portion plates and corresponding side portions of the sensor element which serve as a signal conditioning capacitor. The normal, quiescent capacitance of the signal conditioning capacitor is selected to equal that of the accelerometer capacitor. Further, the width of the side portions of the sensor element in the X-direction are equal to each other and the sum of these widths is equal to the width of the end portion at any point along the Y-direction so that the contribution of the signal responsive capacitor will equal that of the signal conditioning or reference capacitor. This arrangement provides output insensitivity to rotation of the sensor element at the attachment point about the X and Y axes.

According to a feature of the second embodiment, the metal element is formed with a terminal portion extending outwardly through the adhesive strip from the peripheral support frame on the side opposite to that having the first neck portion to isolate any stresses received through the terminal and thereby mitigate any effects of the stresses on the cantilevered blade.

According to another embodiment of the invention, a differential capacitor accelerometer comprises first and second capacitors each comprising a central stationary plate of one capacitor disposed intermediate to a pair of side portion stationary plates of the other capacitor. The central stationary plate of the one capacitor and side stationary plates of the other capacitor are disposed on a surface on one side of a movable sensing element and the stationary plate of the other capacitor and side stationary plates of the one capacitor are disposed on a surface on the opposite side of the movable sensing element. The sensing element, i.e., seismic mass, has a corresponding central portion between first and second side portions with the respective stationary and movable side and central portions spaced from and in alignment with one another. The capacitance of the first and second capacitors, in the quiescent state, are selected to be equal so that the ratio of the capacitance of the capacitors remains constant independent of centering of the seismic mass with respect to the stationary plates in the Z-direction. According to a feature of the invention, the stationary plates may be disposed on a surface of a substrate either facing toward or away from the movable seismic mass.

Offset errors over temperature of a condition responsive capacitive transducer according to another embodiment of the invention, are minimized by using a refractory metal for the sensing element, i.e., metal blade element serving as the movable capacitor plate, and glass having a closely matching temperature coefficient of linear expansion over a selected temperature range for a substrate mounting a stationary capacitor plate. Particularly advantageous refractory metals useful in this embodiment include tungsten, tantalum and molybdenum.

BRIEF DESCRIPTION OF THE DRAWINGS

Other objects, advantages and details of the novel and improved condition responsive accelerometer device and sensor element of the invention appear in the following detailed description of preferred embodiments of the invention, the detailed description referring to the drawings in which.

DETAILED DESCRIPTION OF PREFERRED EMBODIMENTS

Figure 1:
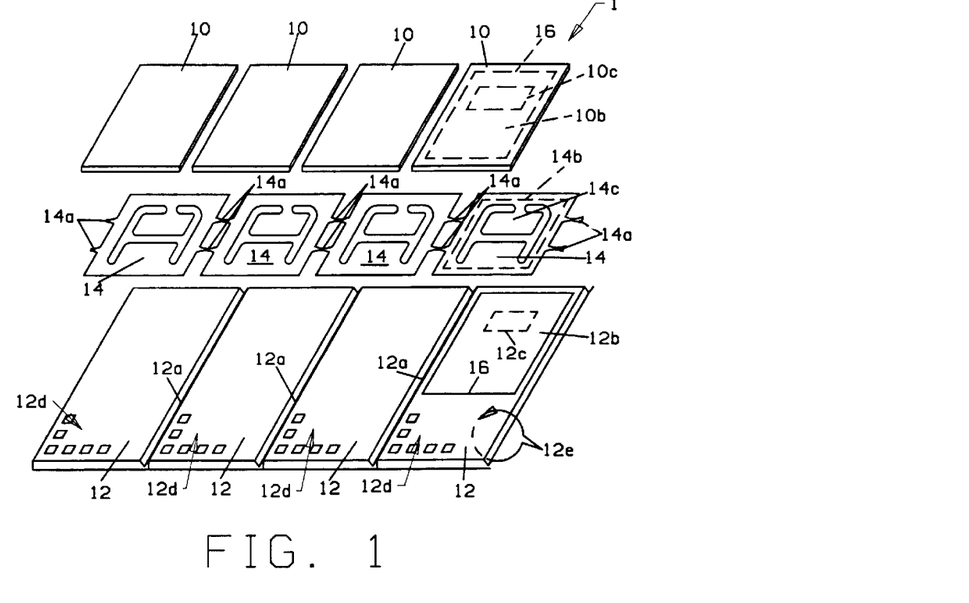
FIG. 1 is a perspective view of a plurality of respective components comprising condition responsive devices made in accordance with a first embodiment of the invention.

With reference to FIG. 1, a plurality of upper generally planar substrates 10 and lower generally planar substrates 12 formed of suitable electrically insulative material are shown with a sensor element in the form of an electrically conductive metal plate element 14 serving as an acceleration responsive seismic mass placed between substrates 10 and 12. The respective upper substrates and lower substrates can be physically connected together for batch or continuous processing as indicated by substrate 12 having scribed portions 12a between adjacent substrates for separation into individual units or, as shown by individual substrates 10 already separated from one another. Sensor elements may be conveniently provided in the form of a reel of previously patterned metal elements connected to one another by frangible tab portions 14a. Any suitable material may be used for the substrates and electrically conductive sensor elements. For example, alumina may be used for the substrates and alloy 42 comprising 42% nickel, less than 2% contaminants and the remainder iron may be used for the electrically conductive sensor elements.

A pattern comprising a strip 16 of adhesive material containing spacer elements is printed or otherwise deposited on the facing surfaces 10b and 12b of respective substrates 10, 12 circumscribing an area corresponding to the outer marginal portion 14b of each sensor element 14. The adhesive material may be a glass frit having a first selected melting temperature with spacer elements such as spherical glass elements having a second melting temperature higher than the first selected temperature so that the spherical elements will maintain the sensor elements in precisely spaced apart relation to the substrates when the components are sandwiched together and subjected to an elevated temperature above the first selected temperature but below the second melting temperature in a known manner.

Suitable electrically conductive patterns are deposited on substrates 10 and 12 to provide, inter alia, source plates 10c, 12c, respectively, shown in dashed lines, on either or both of substrates 10, 12 with suitable electrical traces (not shown) leading to a terminal portion 12d which extends beyond substrate 10. Suitable signal conditioning electronics may be placed on either side of substrate 12 as indicated by arrow 12e. An electrically conductive shield layer (not shown) can be deposited on the outside face surfaces of substrates 10, 12 for electromagnetic shielding purposes. Electrical connections can be achieved by any convenient means such as by soldering or electrically conductive adhesive bonding.

Electrically conductive sensor elements 14, also electrically connected to terminal portions 12d, are patterned to provide a cantilevered beam 14c which serves as a detect plate. The assembled device comprises a sensing capacitor whose capacitance changes with acceleration to which sensor is subjected perpendicular to the face surfaces of the sensor element.

Turning now to FIGS. 2–8, an accelerometer device 100 made in accordance with a second embodiment of the invention comprises an upper substrate 110 and a lower substrate 112 sandwiching therebetween a sensor element or seismic mass in the form of a movable sensor element 114 with element 114 spaced from each substrate by adhesive material 116 containing suitable spacer elements as in the FIG. 1 embodiment.

Figure 5:
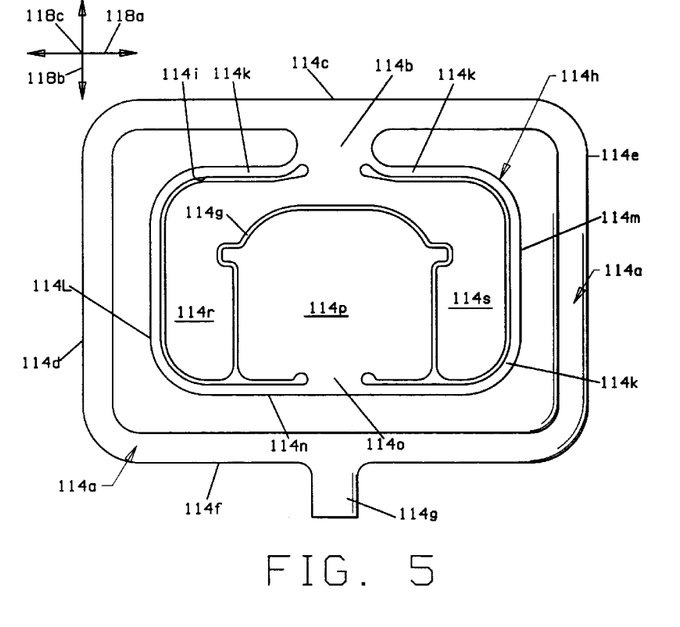
FIG. 5 is a top plan view of a metal element which forms the condition responsive sensor element of the FIGS. 2–4 accelerometer device.

Sensor element 114, best seen in FIG. 5, is composed of suitable electrically conductive material such as alloy 42, used in the first embodiment, and is formed in the following described configuration by any suitable means, for example, by conventional etching techniques. Sensor element 114 has a generally uniform peripheral support frame 114a extending in an X-direction as noted by arrow 118a along first and fourth opposed sides 114c, 114f and in a Y-direction as noted by arrow 118b along second and third opposed sides 114d, 114e. A cantilevered blade 114h extends from a first neck portion 114b centrally disposed on first side 114c toward its opposed side 114f. An electrical terminal portion 114g extends outwardly from a centrally located portion of fourth side 114f. A slot 114i formed in blade 114h defines a generally uniform narrow marginal beam 114k which extends from a location adjacent each side of neck 114b at the first side 114c of element 114 in an X-direction outwardly toward each adjacent opposed side 114l, 114m of the blade and in a Y-direction along sides 114l, 114m toward side 114n opposed to first side 114c and then in an X-direction along side 114n of the blade to a second neck 114o. A slot 114q communicates with slot 114i to define an end portion 114p which extends from second neck 114o inwardly back toward the first side 114c of the element between first and second side portions 114r, 114s, respectively. The average width of side portions 114r and 114s in the X-direction are generally equal to one another and taken together are generally equal to the width of end portion 114p. More specifically for any cross sectional segment taken along the X-direction, for example, as shown in FIG. 6, the width of the side portions 114r and 114s taken in the X-direction equal one another and the sum of these widths equals the width of end portion 114p taking in the X-direction.

Figure 7:
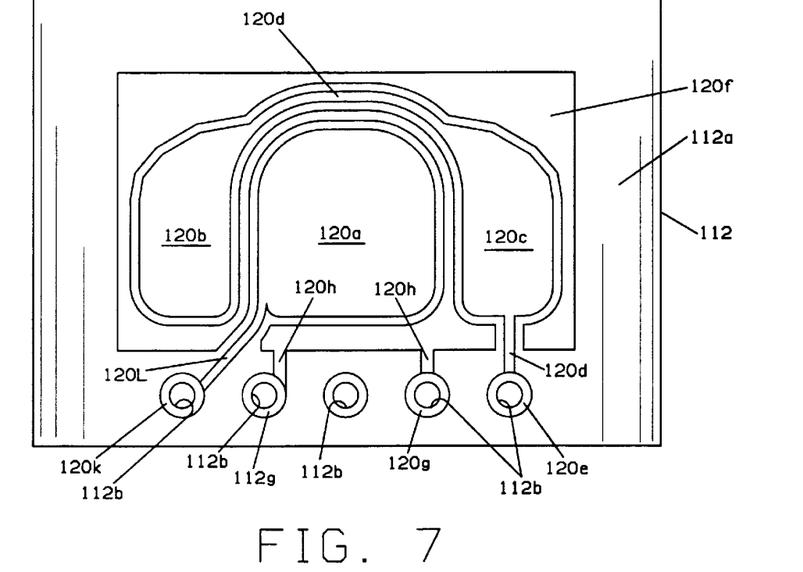
FIG. 7 is a top plan view of the lower substrate, as seen in FIG. 3, showing electrically conductive layers deposited on the upper surface of the substrate.

With reference to FIG. 7, a first stationary electrically conductive plate 120a deposited on the upper surface 112a of lower substrate 112 serves as a source plate. A second stationary plate has a first portion 120b disposed on surface 112a on one side of source plate 120a and a second portion 120c disposed on surface 112a on an opposite side of source plate 120a so that first plate 120a is interdigitated between portions 120b and 120c. Portions 120b and 120c are electrically connected together by a trace 120d and to a terminal portion 120e. An electrically conductive ground layer 120f is preferably deposited on surface 112a in effect surrounding stationary plates 120a, 120b, 120c and is connected to terminal portions 120g by trace 120h. Source plate 120a is connected to terminal portion 120k by trace 120l. Bores 112b are formed through substrate 112 in registration with terminal portions 120e, 120g, 120k to facilitate connection of the several conductive traces to external electrical connectors by conventional means as by including the deposition of electrically conductive material on the walls of bores 112b.

Figure 6:
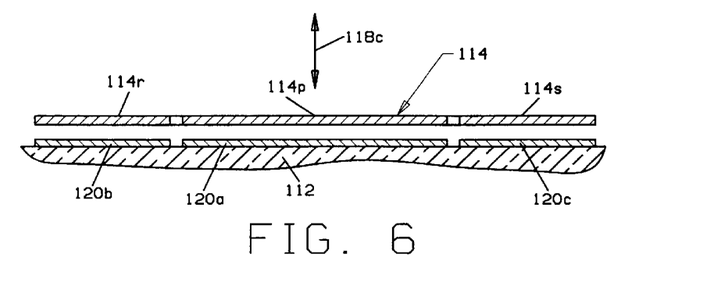
FIG. 6 is a cross sectional view taken in the X-direction (arrow 118a) of a portion of the FIG. 5 sensor element and underlying stationary capacitor plates.
Figure 8:
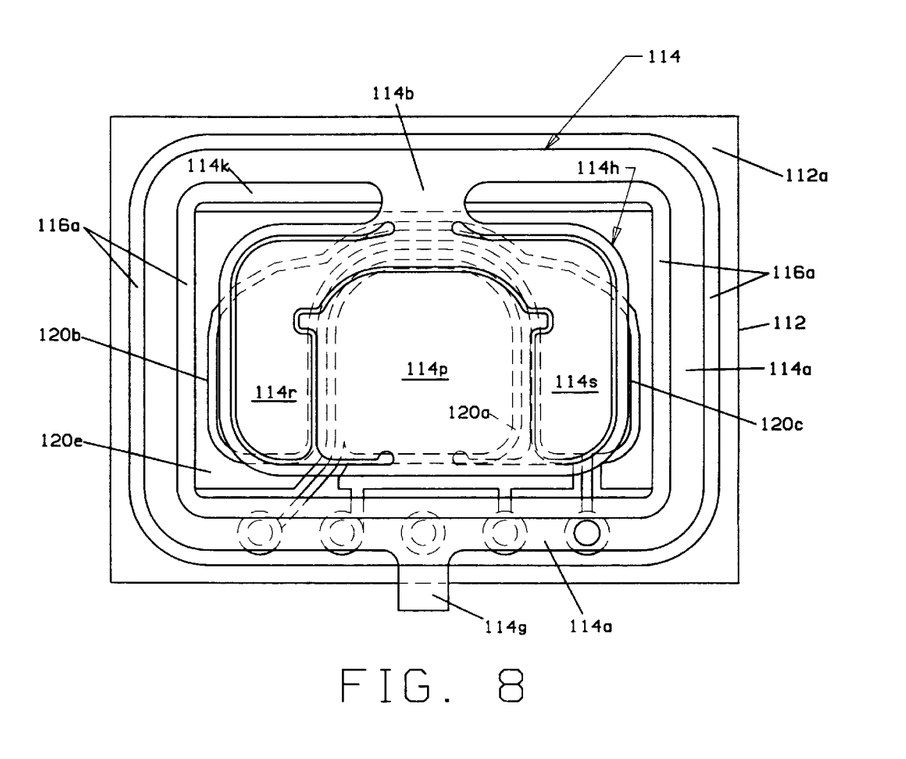
FIG. 8 is a top plan view, similar to that of FIG. 7, but also showing an adhesive spacing layer on the lower substrate and the sensor element received between the substrates.

A strip 116a of electrically insulating adhesive material is deposited on surface 112a to extend around the perimeter of the substrate and is chosen to have a width sufficient to extend on either side of frame portion 114a of sensor element 114 as is clearly shown in FIG. 8 with detect plate portion 114p aligned with and spaced above stationary plate 120a and side portions 114r, 114s aligned with and spaced above first and second stationary side portions 120b, 120c, respectively, see also FIG. 6.

Figure 9:
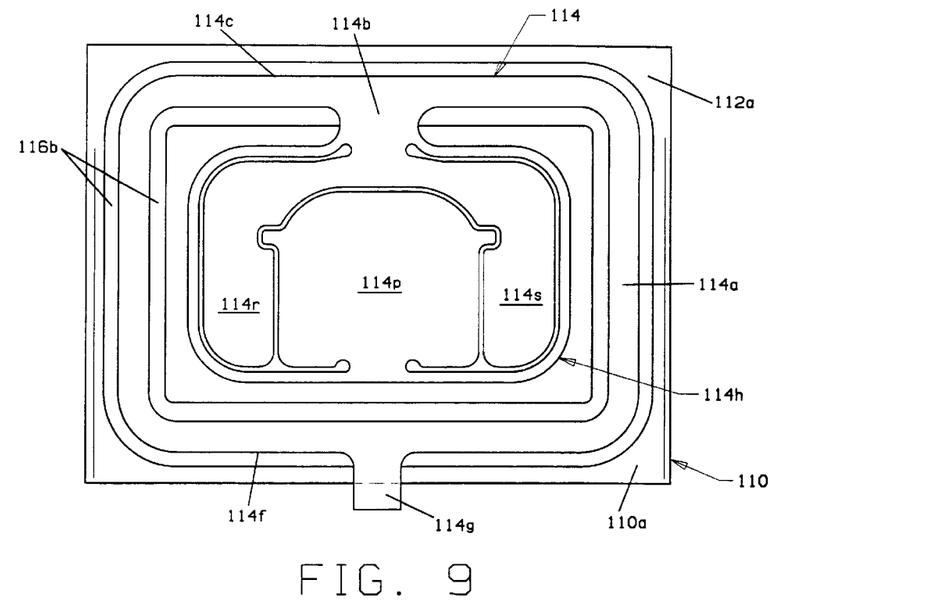
FIG. 9 is a bottom plan view of the upper substrate, as seen in FIG. 3, showing an adhesive spacing layer and the sensor element plate received between the substrates.

A second strip 116b of electrically insulative adhesive material is deposited on lower surface 110a of upper substrate 110 as shown in FIG. 9 so that it will be in alignment with strip 116a on substrate 112 and with the adhesive strip extending on either side of frame portion 114a of sensor element 114. When the substrates are placed together sandwiching sensor element member 114, blade 114h is cantilever mounted at neck 114b and spaced from both substrates 110, 112. Adhesive strips 116a, 116b form a bond directly between the substrates on either side of support frame portion 114a to provide an improved connection among the substrates and sensor element. It will be noted that adhesive strips 116a, 116b extend across neck 114b and that tab portion 114g, extending from support frame portion 114a on side 114f opposite side 114c, extends externally of the adhesive strip. In this manner, tab 114g can be used to provide electrical connection to sensor element 114 at a point removed from blade 114h to thereby isolate any stresses which might be applied to tab 114g and minimize any stress ultimately transferred to blade 114h.

Adhesive material 116 is preferably formed of glass frit having a first selected melting temperature containing a plurality of spacing elements formed of glass material having a second, higher melting temperature. Although cylindrical shaped spacing elements may be used, spherical elements are preferred to provide greater spacing accuracy by minimizing the possibility of overlapping of cylindrical elements.

Figure 2:
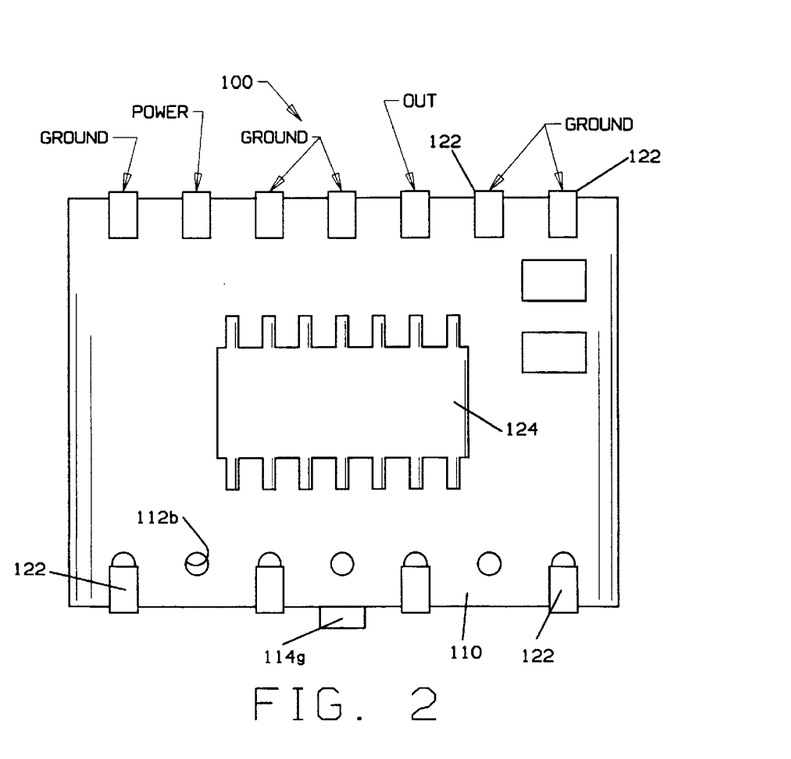
FIG. 2 is top plan view of a circuit board mountable accelerometer device made in accordance with a second embodiment of the invention.
Figure 3:
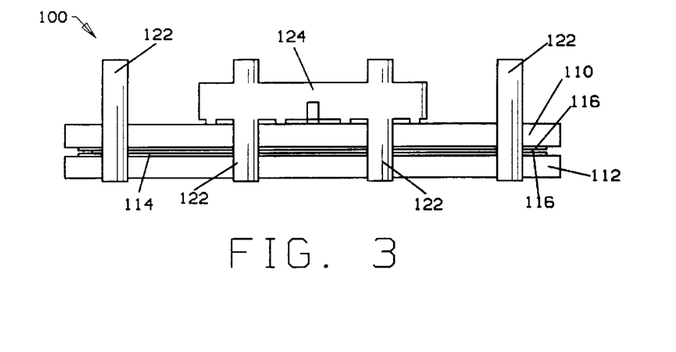
FIGS. 3 and 4 are front and side views respectively of the FIG. 2 accelerometer device.
Figure 4:
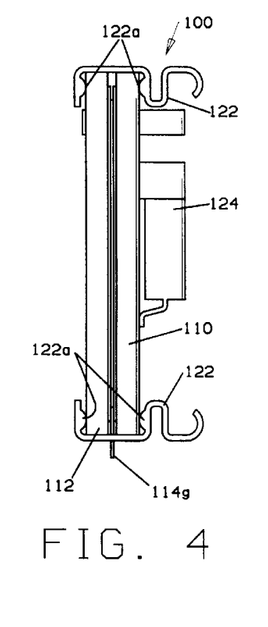

The outer surfaces of substrates 110, 112 may be provided with an electrically conductive layer (not shown) to serve as an electromagnetic shield, if desired. Terminal clips 122 have electrical contact portions 122a spaced apart on the legs of a U-shaped portion for receiving therebetween substrates 110, 112 of accelerometer apparatus 100. Clips 122 provide both electrical interconnection to mating terminal portions on substrates 110, 112 and physical mounting of apparatus 100 on a circuit board (not shown). Suitable conditioning circuitry, including IC 124 can be conveniently mounted directly on substrate 110, as shown in FIGS. 2–4.

Figure 10:
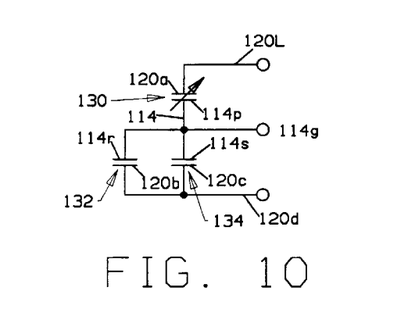
FIG. 10 is a schematic electrical diagram of the acceleration responsive capacitor and signal conditioning capacitor of the FIGS. 2–4 accelerometer device.

FIG. 10 shows an electrical schematic diagram with source plate 120a and detect plate 114p, movable in the Z-direction (arrow 118c in FIG. 5) between substrates 110, 112, serving as the condition responsive capacitor 130 and side stationary plates 120b, 120c and metal plate side portions 114r, 114s, respectively, serving as parallel connected signal conditioning capacitors 132, 134.

Variable capacitive transducers having a capacitive plate movable relative to a stationary plate in dependence upon a condition such as acceleration or a change in fluid pressure, as shown, for example, in U.S. Pat. No. 4,982,351, typically use a reference capacitor as part of associated signal conditioning electronics. The electronics convert a ratio of the reference capacitance to the variable or signal sensing capacitance to a ratiometric output ($V_{out}/V_{supply}$). The FIGS. 2–10 embodiment of the invention provides a common mode rejection arrangement which minimizes thermal and post-impact offset errors and output bias shift after severe mechanical impacts. The zero input stimulus ratio of $C_{132, 134}/C_{130}$ (signal conditioning capacitance/condition responsive capacitance) remains constant for deflections parallel to the face of the substrates of sensor element 114 about the X-axis at the attachment point 114b. Sensor element 114 provides output insensitivity to rotation of the sensor element at attachment point 114b about the X-axis (118a) and Y-axis (118b).

Figure 11:
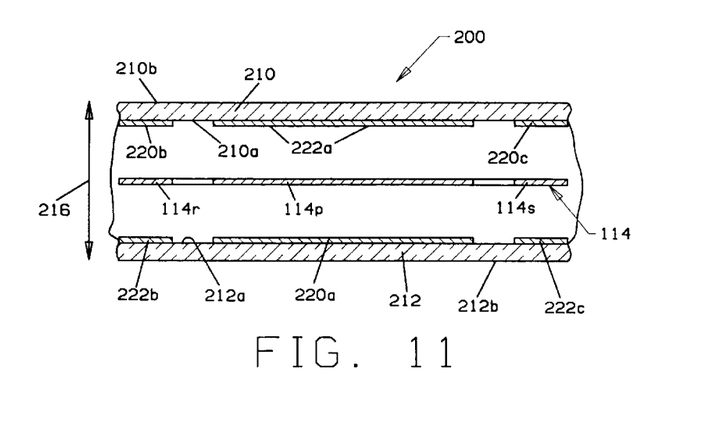
FIGS. 11 and 12 are schematic cross sectional views of the plates of differential capacitive accelerometers showing a movable sensor element forming a detect plate and mounted in spaced relation between opposed supports on which are disposed stationary capacitor plates according to a third embodiment of the invention.
Figure 12:
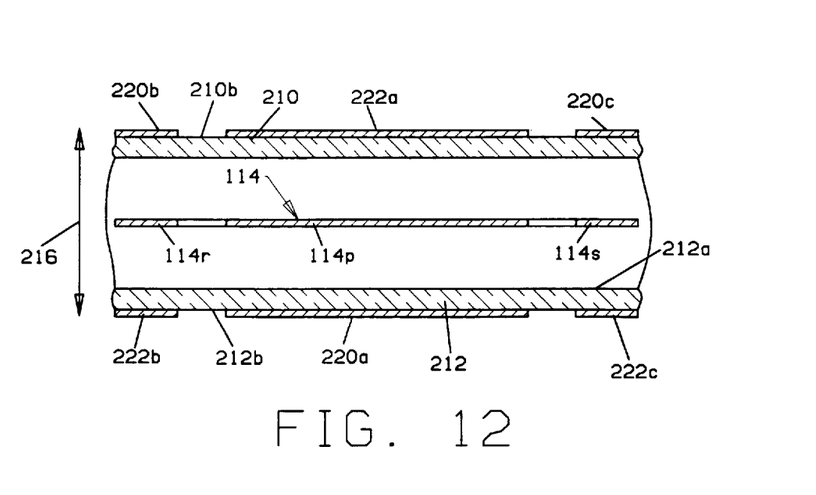
Figure 13:
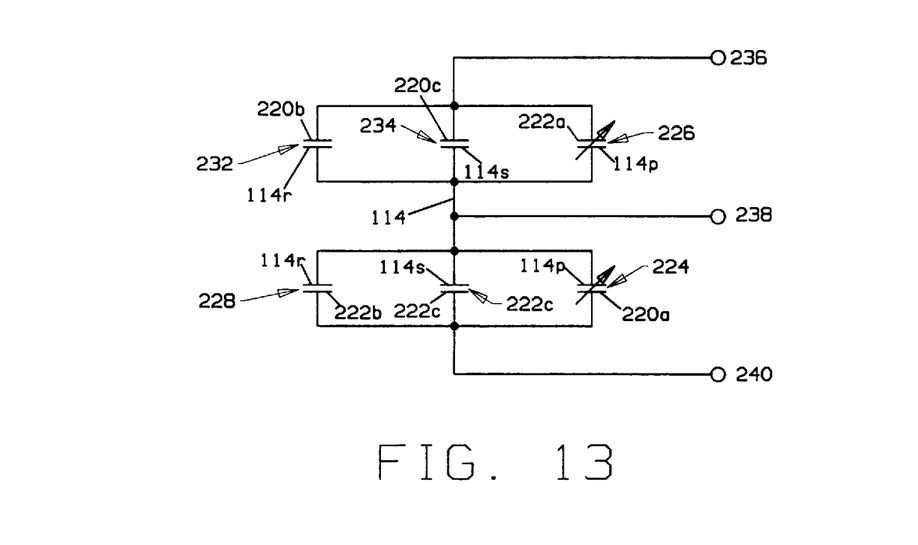
FIG. 13 is a schematic electrical diagram of the differential capacitive accelerometer devices of the FIGS. 11 and 12 embodiment.

FIGS. 11–13 relate to another embodiment 200 shown in broken away cross sectional views comprising a sensor element such as the sensor element 114 of the FIGS. 2–10 embodiment, movable in the Z-direction as shown by arrow 216. Stationary electrically conductive plates 220a, 222b, 222c are disposed on a substrate 212 on a surface 212a facing the sensor element 114 as shown in FIG. 11 or on a surface 212b facing away from sensor element 114 as shown in FIG. 12. Stationary electrically conductive plates 222a, 220b, 220c are disposed on a substrate 210 on a surface 210a facing the sensor element 114 as shown in FIG. 11 or on a surface 210b facing away from sensor element 114 as shown in FIG. 12, as desired. Movable sensor element 114 (portion 114p) forms a first condition responsive capacitor 224 with stationary plate 220a and a second condition responsive capacitor 226 with stationary plate 222a (see FIG. 13). Stationary side plates 222b, 222c form parallel connected signal conditioning capacitors 228, 230, respectively, with movable sensor element 114 (portions 114r, 114s) in turn connected in parallel with second condition responsive capacitor 224. Stationary side plates 220b, 220c form parallel connected signal conditioning capacitors 232, 234, respectively, with movable sensor element 114 (portions 114r, 114s) in turn connected in parallel with second condition responsive capacitor 226.

The capacitance of condition responsive capacitor 224 is selected to be equal to the capacitance of signal conditioning capacitor 228 plus that of 230 while the capacitance of conditioning responsive capacitor 226 is selected to be equal to signal conditioning capacitor 232 plus that of 234. The ratio of the capacitance at terminals 236, 238 to that at terminals 240, 238 remains constant independent of centering of the sensor element and support structure in the Z-direction. With translational movement of the sensor element and the support structure the capacitance of capacitors 226 plus 232 plus 234 and capacitor 224 plus and 228 plus 230 are constant whereas differential movement of sensor element portion 114p relative to side portions 114r and 114s will affect the capacitance of 226 plus 232 plus 234 as well as 224 plus 228 plus 230.

In the above described condition responsive capacitive sensors, conventional materials such as alumina for the stationary support structure and alloy 42 for the sensor elements can be used effectively due to their similar thermal coefficients of linear expansion (TCE). According to another embodiment of the invention, temperature induced errors such as offset error are minimized by use of an improved material system. The improved material system can be used in the previously described embodiments as well as in capacitors based sensors in general. Offset is defined as the output of a sensor for a given input. Sensors made in accordance with this embodiment employ a refractory metal for the condition responsive moveable plate (i.e., movable due to acceleration, pressure, etc.) and glass patterned with an electrically conductive film as the sensor substrate, i.e., stationary plate. Refractory metals which are capable of being formed in generally planar sheets can be utilized with tungsten, tantalum and molybdenum being particularly efficacious. The particular refractory metal employed can be plated with suitable material such as titanium or nickel to facilitate glass sealing and enhance the bond between the glass and the movable plate. A preferred material system comprises tungsten and a suitable glass such as a borosilicate glass. Tungsten and glass are capable of producing mismatches in thermal coefficients of linear expansion (TCE) of 0.2 ppm/°C. and 0.1 ppm/°C. over the temperature ranges of −40° C. to 500° C. and −40° C. to 125° C., respectively. In contradistinction, conventional sensors of alloy 42 and 96% pure alumina are capable of producing mismatches in TCE of 2.5 ppm/°C. and 1.7 ppm/°C. over the same respective temperature ranges. Thus, non-linear strain caused by differences in TCE are minimized using the improved material system thereby minimizing offset error over temperature.

A stable Young's modulus over the operating temperature range (typically −40° C. to 125° C. for automotive applications) is important in minimizing temperature induced sensitivity errors. The temperature stability of the Young's modulus of alloy 42 (change with respect to RT value: 0.013%/°C. to 0.045%/°C.) is 30% to 300% worse than that of tungsten (change with respect to RT value: −0.010%/°C.).

Tungsten also provides improvements in yield strength over alloy 42, 100 ksi to 500 ksi for tungsten and 30 ksi to 70 ksi for alloy 42. This characteristic is beneficial in providing stability after high acceleration events such as dropping of the sensor on a hard surface.

Yet another advantage provided by the improved material system is that sensors made from such materials are insensitive to magnetic fields.

It should be understood that although particular embodiments of the invention have been described by way of illustrating the invention, the invention includes all modifications and equivalents of the disclosed embodiments falling within the scope of the appended claims. For example, although glass spacer elements in a matrix of a lower melting glass is described as the adhesive and spacing mechanism for mounting the sensor blade between the substrates, it will be understood that other spacing means can be employed. For example, projections could be formed on the surface of the sensing element and/or the substrates, if desired. Further, although specific numbers of capacitor plates have been disclosed, a plurality of capacitors of any desired number can be employed which exploit the error minimization benefits described.

What is claimed:

1. A condition responsive sensor comprising first and second substrates, a first electrically conductive stationary plate defining a first capacitor plate disposed on one of the first and second substrates, a condition responsive, electrically conductive sensor element having a movable second capacitor plate portion sandwiched between the first and second substrates and generally aligned with and spaced from the first capacitor plate, the first capacitor plate and the second capacitor plate portion forming a condition responsive capacitor, signal conditioning means comprising a second stationary plate having first and second portions disposed on one of the first and second substrates, the sensor element having a first and a second spaced apart side portion generally aligned with the first and second portions of the second stationary plate respectively, the first and second portions of the second stationary plate being electrically connected to one another, the second stationary plate and the sensor element forming a signal conditioning capacitor.

2. A condition responsive sensor according to claim 1 in which the first and second stationary plates are disposed on the same substrate.

3. A condition responsive sensor according to claim 1 in which the first stationary plate is disposed on the first substrate and the second stationary plate is disposed on the second substrate and further comprising a third electrically conductive stationary plate disposed on the second substrate aligned with the first capacitor plate, a fourth electrically conductive stationary plate having a first and second spaced apart portions disposed on the first substrate on either side of the first stationary plate and generally aligned respectively with the first and second portions of the second stationary plate, the first and second portions of the fourth stationary plate being electrically connected together, the third stationary plate and the fourth capacitor plate portion forming an additional condition responsive capacitor and the first and second portions of the fourth stationary plate and the sensor element forming an additional signal conditioning capacitor.

4. A condition responsive sensor according to claim 3 in which the capacitance of the additional signal conditioning capacitors is selected to be equal to the capacitance of the condition responsive capacitor and the capacitance of the additional condition responsive capacitor is selected to be equal to the capacitance of the signal conditioning capacitor.

5. A condition responsive sensor according to claim 1 in which the capacitance of the condition responsive capacitor is selected to be equal to the capacitance of the signal conditioning capacitor.

6. A condition responsive sensor according to claim 1 in which the second capacitor plate portion of the sensor element is disposed intermediate to the first and second side portions of the sensor element in a first direction and the width of the first and second side portions at any point along the surface of the sensor element in a second direction perpendicular to the first direction are equal to one another and the sum of the widths of the first and second side portions in the first direction at said point along the second direction is equal to the width of the second capacitor plate portion of the sensor element in the first direction.

7. A condition responsive sensor comprising first and second substrates, a first electrically conductive stationary plate defining a first capacitor plate disposed on one of the first and second substrates, a condition responsive, electrically conductive sensor element having a movable second capacitor plate portion sandwiched between the first and second substrates and generally aligned with and spaced from the first capacitor plate, said condition responsive, electrically conductive, sensor element comprises a frame having a first side, adjacent sides and a side opposite the first side with a centrally disposed blade formed from the sensor element extending inwardly from a neck integrally attached at the center of the first side, a narrow marginal beam formed from the blade extending from a location proximate to the neck toward each adjacent side and along each adjacent side toward the opposite side and toward the center of the opposite side, first and second side portions formed in the sensor element spaced from one another and extending from a location proximate to the first side along each respective adjacent side toward the opposite side and the second capacitor plate portion being formed from the sensor element integrally attached to the center of the opposite side and extending toward the first side of the frame and being disposed between the first and second side portions of the sensor element, the first capacitor plate and the second capacitor plate portion forming a condition responsive capacitor, signal conditioning means comprising a second stationary plate having first and second portions disposed on one of the first and second substrates, the sensor element having a first and a second spaced apart side portion generally aligned with the first and second portions of the second stationary plate respectively, the first and second portions of the second stationary plate being electrically connected to one another, the second stationary plate and the sensor element forming a signal conditioning capacitor.

8. A condition responsive sensor comprising an electrically insulative substrate having first electrically conductive stationary plate on a surface of the substrate defining a first capacitor plate, a condition responsive, electrically conductive sensor element having a movable portion defining a second capacitor plate overlying and generally aligned with and spaced from the first capacitor plate, the first and second capacitor plates forming a condition responsive capacitor, signal conditioning means comprising a second stationary plate having first and second portions on said surface of the substrate, the first stationary plate being disposed between the first and second portions of the second stationary plate, the sensor element having a first and a second spaced apart portion overlying and generally aligned with the first and second portions of the second stationary plate respectively, the first and second portions of the second stationary plate being electrically connected to one another, the second stationary plate and sensor element forming a signal conditioning capacitor.

* * * * *